United States Patent
Yamada et al.

(10) Patent No.: US 9,200,692 B2
(45) Date of Patent: Dec. 1, 2015

(54) LEAF VALVE STRUCTURE

(75) Inventors: Hideki Yamada, Minokamo (JP);
Tomoharu Murakami, Kakamigahara (JP); Tadashi Oikawa, Nagoya (JP);
Tomohito Amino, Kasugai (JP);
Yoshinori Nomura, Kasugai (JP)

(73) Assignees: KAYABA INDUSTRY CO., LTD., Tokyo (JP); FINE SINTER CO., LTD., Aichi (JP)

( * ) Notice: Subject to any disclaimer, the term of this patent is extended or adjusted under 35 U.S.C. 154(b) by 1 day.

(21) Appl. No.: 13/512,646

(22) PCT Filed: Mar. 24, 2011

(86) PCT No.: PCT/JP2011/057159
§ 371 (c)(1),
(2), (4) Date: May 30, 2012

(87) PCT Pub. No.: WO2011/125515
PCT Pub. Date: Oct. 13, 2011

(65) Prior Publication Data
US 2012/0228071 A1  Sep. 13, 2012

(30) Foreign Application Priority Data
Apr. 2, 2010 (JP) ................. 2010-086051

(51) Int. Cl.
F16F 9/348 (2006.01)

(52) U.S. Cl.
CPC ............ *F16F 9/348* (2013.01); *F16F 2222/10* (2013.01); *F16F 2230/36* (2013.01); *Y10T 137/7858* (2015.04); *Y10T 137/7932* (2015.04)

(58) Field of Classification Search
CPC ..... F16F 9/348; F16F 9/3485; F16F 2222/10; F16F 2230/36

USPC ............... 188/322.14, 322.15, 282.5, 282.6; 137/854
See application file for complete search history.

(56) References Cited

U.S. PATENT DOCUMENTS

| 3,208,474 A | 9/1965 | Allinquant |
| 3,256,961 A | 6/1966 | Bourcier De Carbon |

(Continued)

FOREIGN PATENT DOCUMENTS

| AT | 258138 B | 11/1967 |
| DE | 2424040 B2 | 10/1980 |
| DE | 4404835 A1 | 8/1995 |

(Continued)

OTHER PUBLICATIONS

International Search Report and Written Opinion for PCT/JP2011/057159, dated Jun. 14, 2011.

(Continued)

*Primary Examiner* — Bradley King
(74) *Attorney, Agent, or Firm* — Hauptman Ham, LLP

(57) ABSTRACT

A leaf valve structure according to this invention comprises an annular valve seat, and a leaf that is seated on the valve seat under a predetermined elastic supporting force against a pressure of a working fluid on an inner side of the valve seat. A recessed depression portion having an opening portion on both an inner periphery of the valve seat and a seating surface of the leaf is formed in the valve seat, thereby creating a site where the pressure of the working fluid on the inner side of the valve seat can act more easily on a seating surface between the valve seat and the leaf valve. Accordingly, an effect of a surface adsorption force applied to the leaf valve by the valve seat on a cracking pressure can be suppressed, and as a result, the leaf valve can be lifted under a stable cracking pressure.

6 Claims, 2 Drawing Sheets

(56) References Cited

U.S. PATENT DOCUMENTS

| | | | |
|---|---|---|---|
| 4,350,179 A * | 9/1982 | Bunn et al. | 137/540 |
| 4,398,559 A * | 8/1983 | Bunn et al. | 137/516.15 |
| 5,042,624 A * | 8/1991 | Furuya et al. | 188/280 |
| 5,547,050 A | 8/1996 | Beck | |
| 5,595,269 A * | 1/1997 | Beck | 188/282.6 |
| 5,769,192 A | 6/1998 | Beck | |
| 6,230,858 B1 * | 5/2001 | Moradmand et al. | 188/322.13 |
| 6,260,678 B1 * | 7/2001 | Moradmand et al. | 188/322.14 |
| 2013/0105261 A1 * | 5/2013 | Murata | 188/322.14 |

FOREIGN PATENT DOCUMENTS

| | | |
|---|---|---|
| JP | 59073610 A | 4/1984 |
| JP | 61156742 U | 9/1986 |
| JP | 1111840 U | 7/1989 |
| JP | 2278026 A | 11/1990 |
| JP | 2007071236 A | 3/2007 |

OTHER PUBLICATIONS

Office Action received Jun. 19, 2015, corresponding to German patent application No. 112011101182.2.

* cited by examiner

LEAF VALVE STRUCTURE

RELATED APPLICATIONS

The present application is a national Phase of International Application Number PCT/JP2011/057159, filed Mar. 24, 2011, and claims priority from Japanese Application Number 2010-086051, filed Apr. 2, 2010.

FIELD OF THE INVENTION

This invention relates to a damping valve for a hydraulic shock absorber.

BACKGROUND OF THE INVENTION

A hydraulic shock absorber that absorbs road surface vibration input into a vehicle includes a damping valve that damps vibration by applying resistance to a flow of working fluid. JP01-111840U, published by the Japan Patent Office in 1996, proposes a damping valve structure for reducing an effect of a viscosity of the working fluid on a generated damping force.

The damping valve includes a main leaf valve seated on a valve seat and a sub-leaf valve seated on a hole portion formed in the main leaf valve. By setting a valve opening pressure of the sub-leaf valve to be lower than a valve opening pressure of the main leaf valve, working oil flows through the sub-leaf valve when a shock absorber strokes at a low speed, and when the shock absorber strokes at a high speed, the main leaf valve opens.

By constructing the damping valve in this manner, the effect of the viscosity of the working fluid on a damping force characteristic of the damping valve can be reduced even when the viscosity of the working fluid is high, for example at a low temperature or the like.

SUMMARY OF THE INVENTION

A valve seat of a leaf valve is typically formed from a sintered alloy or the like having a lower hardness than a leaf of the leaf valve. Further, a crown portion of the valve seat that contacts the leaf is typically formed with a smooth flat surface by sizing or the like.

In the damping valve structure according to the prior art, formation of a working fluid film between the crown portion of the valve seat and the leaf valve is permitted, but fluid pressure may not be introduced between the crown portion of the valve seat and the leaf valve.

When a smoothness of the valve seat is improved due to improvements in processing precision, the leaf valve adheres to the crown portion of the valve seat with a great surface adsorption force. Therefore, a greater amount of pressure than a normal cracking pressure may be required to lift the leaf valve adhered to the crown portion of the valve seat.

In this case, the leaf may be lifted suddenly after greatly exceeding the cracking pressure. Sudden lifting of the leaf causes noise generation. Further, variation in the cracking pressure of the leaf leads to variation in the damping force characteristic.

It is therefore an object of this invention to reduce the effect of a difference in a viscosity of a working fluid on a cracking pressure of a leaf.

In order to achieve the above object, this invention provides a leaf valve structure comprising an annular valve seat, and a leaf that is seated on the valve seat under a predetermined elastic supporting force against a pressure of a working fluid on an inner side of the valve seat. A recessed depression portion having an opening portion on both an inner periphery of the valve seat and a seating surface of the leaf is formed in the valve seat.

The details as well as other features and advantages of this invention are set forth in the remainder of the specification and are shown in the accompanying drawings.

DESCRIPTION OF THE PREFERRED EMBODIMENTS

Figure 1:
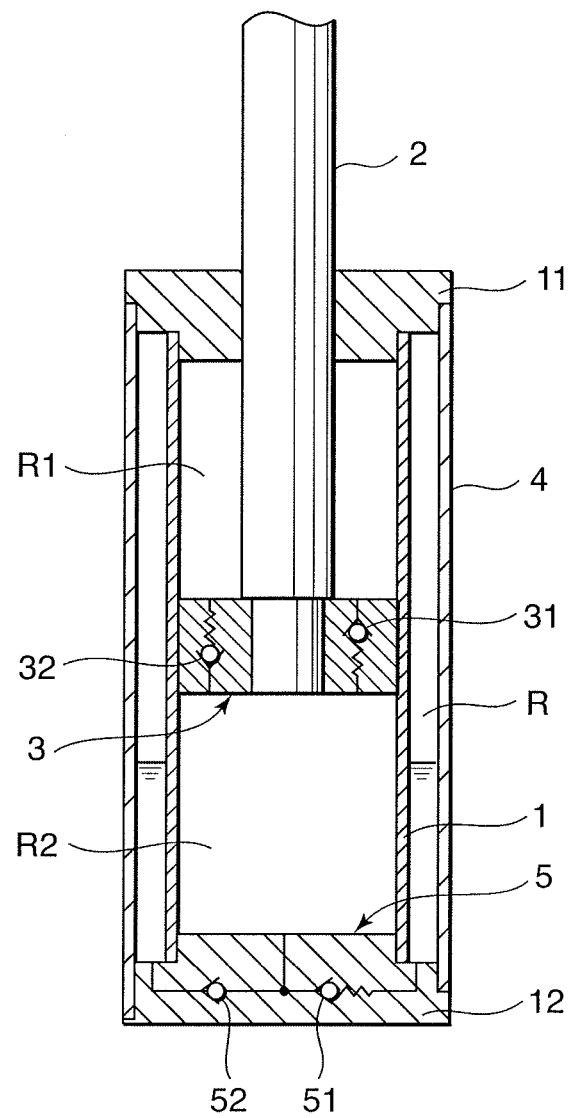
FIG. 1 is a schematic longitudinal sectional view of a hydraulic shock absorber that comprises a base valve having a leaf valve structure according to this invention.

Referring to FIG. 1 of the drawings, a leaf valve structure according to this invention is applied to a base valve 5 of a hydraulic shock absorber that absorbs road surface vibration input into a vehicle, for example.

The hydraulic shock absorber includes a cylinder 1, a piston rod 2 inserted into the cylinder 1 from an axial direction to be free to slide, and a piston 3 fixed to a tip end of the piston rod 2 in order to slide along an inner periphery of the cylinder 1.

A piston rod side oil chamber R1 and an opposite side oil chamber R2 are defined by the piston 3 on an inner side the cylinder 1.

The cylinder 1 is housed inside an outer tube 4 coaxially therewith. One axial direction end of the outer tube 4 and the cylinder 1 is tightly sealed by a rod guide 11. Another axial direction end of the outer tube 4 and the cylinder 1 is tightly sealed by a bottom block 12. The piston rod 2 penetrates the rod guide 11 to be free to slide in the axial direction.

A reservoir R is provided between the outer tube 4 and the cylinder 1. The reservoir R compensates for variation in an amount of oil in the cylinder 1, which occurs as the piston rod 2 infiltrates the cylinder 1 and retreats from the cylinder 1. A gas is sealed into a space above an oil surface of the reservoir R.

The piston 3 is provided with an expansion side damping valve 31 that allows a working oil to flow from the piston rod side oil chamber R1 to the oil chamber R2 on the opposite side to the piston rod 2 under a predetermined flow resistance, and a compression side damping valve 32 that allows the working oil to flow from the oil chamber R2 on the opposite side to the piston rod 2 to the piston rod side oil chamber R1 under a predetermined flow resistance. The compression side damping valve 32 may be replaced by a check valve that allows the working oil to flow without resistance from the oil chamber R2 on the opposite side to the piston rod 2 to the piston rod side oil chamber R1.

The base valve 5 is provided on the bottom block 12. The base valve 5 is constituted by a compression side damping valve 51 that allows the working oil to flow out from the oil chamber R2 on the opposite side to the piston rod 2 to the reservoir R under a predetermined flow resistance, and a check valve 52 that allows the working oil to flow in an opposite direction without resistance.

With the structure described above, the hydraulic shock absorber damps vibration input from a road surface into a vehicle body via an axle. The hydraulic shock absorber may be either an upright type shock absorber in which the piston rod 2 is coupled to the vehicle body of the vehicle and the outer tube 4 is coupled to the axle of the vehicle, or an inverted type shock absorber in which the outer tube 4 is coupled to the vehicle body of the vehicle and the piston rod 2 is coupled to the axle of the vehicle.

Figure 2:
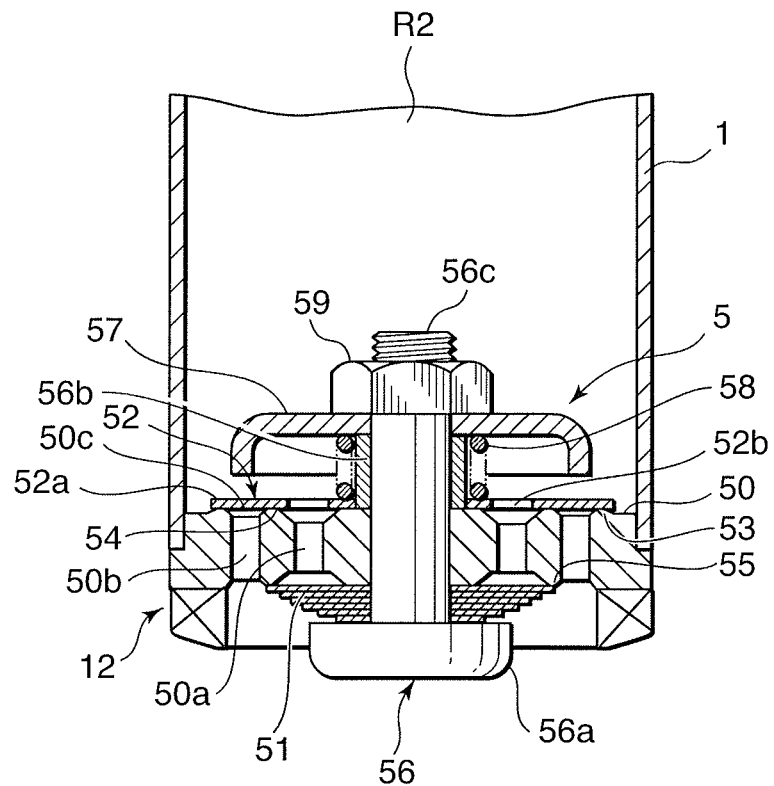
FIG. 2 is an enlarged longitudinal sectional view of the base valve.

Referring to FIG. 2, the bottom block 12 includes a valve disk 50. The base valve 5 includes the compression side damping valve 51 and the check valve 52. The compression side damping valve 51 is provided in an outlet communicating with the reservoir R of a compression side passage 50a formed to penetrate the valve disk 50. The check valve 52 is provided in an outlet facing the oil chamber R2 of an expansion side passage 50b that penetrates the valve disk 50 on an outer side of the compression side passage 50a.

The compression side damping valve 51 is constituted by a laminated body of a plurality of leaves. The laminated body is sandwiched between a bolt head 56a of a bolt 56 that penetrates a center of the valve disk 50 and the valve disk 50, and when an outer peripheral portion thereof is seated on a valve seat 55 formed on the valve disk 50, the compression side passage 50a is closed.

The bolt 56 penetrating the center of the valve disk 50 also penetrates a tubular spacer 56b and a plate-shaped valve stopper 57. A nut 59 is fastened to a penetrating end 56c of the bolt 56.

The check valve 52 includes a single circular leaf 52a fitted onto an outer periphery of the spacer 56b, and valve seats 53 and 54 formed on the valve disk 50 as annular projections centering on the bolt 56. When the leaf 52a is seated on the valve seats 53 and 54, the check valve 52 closes the outlet of the expansion side passage 50b. A hole portion 52b that connects the compression side passage 50a to the oil chamber R2 at all times is formed in a site of the leaf 52a facing an inlet of the compression side passage 50a.

The leaf 52a is biased toward the valve seats 53 and 54 by a return spring 58 that is interposed between the leaf 52a and the valve stopper 57 on an outer side of the spacer 56b. When a pressure of the oil chamber R2 on the opposite side to the piston rod 2 decreases such that a pressure of the reservoir R exceeds the pressure of the oil chamber R2, the leaf 52a is lifted from the valve seats 53 and 54, whereby the working oil in the reservoir R flows into the oil chamber R2 without resistance. When an outer periphery of the valve stopper 57 contacts the leaf 52a, the valve stopper 57 limits a lift position of the leaf 52a.

Figure 3:
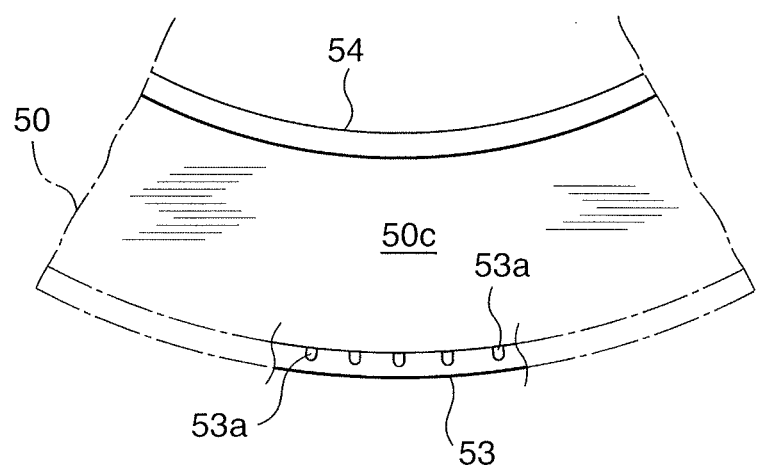
FIG. 3 is a plan view of a valve seat according to this invention.

Referring to FIG. 3, an annular groove 50c that communicates with the expansion side passage 50b is formed in the valve disk 50 between the outer side valve seat 53 and the inner side valve seat 54 on which the leaf 52a is seated.

A plurality of recessed depression portions 53a that lead a pressure of the annular groove 50c to a joint surface between the leaf 52a and the valve seat 53 are formed in the outer side valve seat 53 at predetermined circumferential direction intervals. It should be noted, however, that the valve seat 53 maintains a joint surface with the leaf 52a in sites on a radial direction outer side of the recessed depression portions 53a. In other words, even when the recessed depression portions 53a are formed, the valve seat 53 maintains an uninterrupted joint surface with the leaf 52a around an entire circumference of the joint surface.

The recessed depression portions 53a are constituted by cutouts opening respectively onto a seating surface on which the leaf 52a is seated and an inner peripheral surface facing the annular groove 50c.

A radial direction width of the joint surface positioned on the radial direction outer side of the recessed depression portions 53a is narrowed by the recessed depression portions 53a. A width of the valve seat 53 on either circumferential direction side of the recessed depression portions 53a, on the other hand, is wider. Hence, a surface adsorption force applied to the leaf 52a by the valve seat 53 is smaller on the joint surface positioned on the radial direction outer side of the recessed depression portions 53a than on the joint surface in other sites.

Meanwhile, a working oil pressure on an inner side of the valve seat 53 is led to the recessed depression portions 53a at all times. Therefore, when this pressure increases relative to the pressure of the oil chamber R2, peeling away of the leaf 52a from the valve seat 53 is promoted on a periphery of the recessed depression portions 53a including the joint surface having a narrow radial direction width on the radial direction outer side of the recessed depression portions 53a. By ensuring that the leaf 52a is peeled away from the valve seat 53 earlier on this joint surface than in the other sites, the leaf 52a is lifted with favorable responsiveness relative to variation in the relative pressure between the oil chamber R2 and the reservoir R.

By promoting peeling of the leaf 52a from the valve seat 53 in this manner, the check valve 52 is activated with favorable responsiveness when the pressure of the expansion side passage 50b reaches a cracking pressure, even in a case where a viscosity of the working oil is high, for example at low temperatures.

With the structure described above, even in a case where a smoothness of the valve seat 53 is high such that the surface adsorption force applied to the leaf 52a by the valve seat 53 is large, the surface adsorption force can be canceled or reduced.

When the recessed depression portions 53a are not provided in the valve seat 53, the surface adsorption force of the valve seat 53 may prevent the leaf 52a from being lifted until an upstream pressure greatly exceeds the cracking pressure, and when the leaf 52a is lifted rapidly thereafter, noise may be generated. Further, when the cracking pressure of the leaf 52a is not constant, a damping characteristic of the hydraulic shock absorber may become unstable. By providing the recessed depression portions 53a in the valve seat 53, these problems can be solved, and as a result, a hydraulic shock absorber exhibiting a quiet, stable damping force characteristic can be realized.

The check valve 52 opens during an expansion operation of the hydraulic shock absorber, thereby permitting an inflow from the reservoir R to the oil chamber R2. At this time, a differential pressure generated between the reservoir R and the oil chamber R2 is smaller than a differential pressure generated between the oil chamber R1 and the oil chamber R2, for example. Accordingly, an oil pressure acting on the leaf 52a in a lifting direction on the inner side of the valve seat 52 is also small. Therefore, the effect of the surface adsorption force of the valve seat 53 on the leaf 52a is correspondingly large at the start of valve lifting. According to this invention, the radial direction width of the valve seat 53 is varied alternately, and therefore a particularly favorable effect is obtained in terms of eliminating the effect of the surface adsorption force.

It should be noted that by forming a tip end of the recessed depression portions 53a, which is positioned on an opposite side to an opening portion of the recessed depression portions 53a, in a curved surface shape, die releasing can be facilitated when the valve seat 53 is die-molded.

The contents of Tokugan 2010-086051, with a filing date of Apr. 2, 2010 in Japan, are hereby incorporated by reference.

Although the invention has been described above with reference to a certain embodiment, the invention is not limited to the embodiment described above. Modifications and variations of the embodiments described above will occur to those skilled in the art, within the scope of the claims.

For example, in the above embodiment, the recessed depression portions 53a are formed around the entire circumference of the valve seat 53, but the recessed depression portions 53a may be formed in only a partial angular region in the circumferential direction of the valve seat 53. Likewise in this case, the leaf 52a can be peeled away from the valve seat 53 easily in the region formed with the recessed depression portions 53a, thereby promoting lifting of the entire leaf 52a.

Similar recessed depression portions to the recessed depression portions 53a are preferably formed on the outer periphery of the valve seat 53 in order to reduce the radial direction width of the joint surface positioned on the outer side of the recessed depression portions 53a.

In the above embodiments, the leaf valve structure according to this invention is applied to the check valve 52 of the base valve 5. However, the leaf valve structure according to this invention may also be applied to the compression side damping valve 51 of the base valve 5. Furthermore, the leaf valve structure according to this invention may be applied to the expansion side damping valve 31 or the compression side damping valve 32 provided in the piston 3.

A corresponding effect can be expected in a case where the recessed depression portions 53a are formed in the inner side valve seat 54 rather than the outer side valve seat 53.

Further, the fluid applied to the leaf valve structure according to this invention is not limited to working oil, and any fluid including an aqueous solution may be used.

INDUSTRIAL FIELD OF APPLICATION

As described above, according to this invention, the effect of a difference in a viscosity of a working fluid on a cracking pressure of a leaf valve can be reduced. Therefore, by applying this invention to a hydraulic shock absorber that damps vibration of a vehicle, favorable effects can be obtained in terms of stabilizing a damping force characteristic and suppressing noise generation.

The embodiments of this invention in which an exclusive property or privilege is claimed are defined as follows:

1. A shock absorber comprising:
a fluid chamber,
a reservoir that supplies the working fluid to the fluid chamber in response to a reduction in a pressure of the fluid chamber, and
a check valve configured to allow the working fluid to flow from the reservoir to the fluid chamber and block a flow of the working fluid in an opposite direction,
wherein the check valve is constituted by a leaf valve structure, the leaf valve structure comprising:
a valve disk having a center;
an annular valve seat formed on the valve disk;
an annular groove formed continuously in a circumferential direction for 360 degrees in the valve disk;
a fluid passage formed in the valve disk and having an opening in the annular groove; and
a leaf that is seated on the valve seat to close the annular groove, and wherein
the valve seat comprises an inner peripheral side valve seat that defines an inner periphery of the annular groove and an outer peripheral side valve seat that defines an outer periphery of the annular groove,
a recessed depression portion is formed in the outer peripheral side valve seat, the recessed depression portion having an opening portion on both an inner periphery of the outer peripheral side valve seat and a seating surface of the outer peripheral side valve seat on which the leaf is seated,
a size of the opening portion in the seating surface of the outer peripheral side valve seat in a circumferential direction is set to be smaller than a whole circumferential length of the seating surface of the outer peripheral side valve seat,
a size of the opening portion in the seating surface of the outer peripheral side valve seat in a radial direction is smaller than a size of the fluid passage in the radial direction, and
the seating surface of the outer peripheral side valve seat is also formed on a radially outer side of the opening portion in the seating surface of the outer peripheral side valve seat with respect to the center of the valve disk.

2. The shock absorber as defined in claim 1, comprising:
a cylinder;
a piston rod inserted into the cylinder to be free to slide; and
a piston fixed to the piston rod so as to slide along an inner peripheral surface of the cylinder,
wherein the fluid chamber is configured to expand as the piston rod retreats from the cylinder.

3. A shock absorber comprising:
a fluid chamber,
a reservoir that supplies the working fluid to the fluid chamber in response to a reduction in a pressure of the fluid chamber, and
a check valve configured to allow the working fluid to flow from the reservoir to the fluid chamber and block a flow of the working fluid in an opposite direction,
wherein the check valve is constituted by a leaf valve structure, the leaf valve structure comprising:
a valve disk having a center;
an annular valve seat formed on the valve disk;
an annular groove formed continuously in a circumferential direction for 360 degrees in the valve disk;
a fluid passage formed in the valve disk and having an opening in the annular groove; and
a leaf that is seated on the valve seat to close the annular groove, and
wherein the valve seat comprises an inner peripheral side valve seat that defines an inner periphery of the annular groove and an outer peripheral side valve seat that defines an outer periphery of the annular groove,
a recessed depression portion is formed in the outer peripheral side valve seat, the recessed depression portion having an opening portion on both an inner periphery of the outer peripheral side valve seat and a seating surface of the outer peripheral side valve seat on which the leaf is seated,
a size of the opening portion in the seating surface of the outer peripheral side valve seat in a circumferential direction is set to be smaller than a whole circumferential length of the seating surface of the inner peripheral side valve seat,
a size of the opening portion in the seating surface of the outer peripheral side valve seat in a radial direction is smaller than a size of the fluid passage in the radial direction,
the seating surface of the outer peripheral side valve seat is also formed on a radially outer side of the opening portion in the seating surface of the outer peripheral side valve seat with respect to the center of the valve disk, and an area of the leaf that contacts the seating surface of the outer peripheral side valve seat is set to be greater than an area of the leaf that faces the opening portion in the seating surface of the outer peripheral side valve seat.

4. The shock absorber as defined in claim 3, comprising:

a cylinder;

a piston rod inserted into the cylinder to be free to slide; and a piston fixed to the piston rod so as to slide along an inner peripheral surface of the cylinder, wherein the fluid chamber is configured to expand as the piston rod retreats from the cylinder.

5. A shock absorber comprising:

a fluid chamber, a reservoir that supplies the working fluid to the fluid chamber in response to a reduction in a pressure of the fluid chamber, and a check valve configured to allow the working fluid to flow from the reservoir to the fluid chamber and block a flow of the working fluid in an opposite direction, wherein the check valve is constituted by a leaf valve structure, the leaf valve structure comprising:

a valve disk having a center;

an annular valve seat formed on the valve disk;

an annular groove formed continuously in a circumferential direction for 360 degrees in the valve disk;

a fluid passage formed in the valve disk and having an opening in the annular groove; and a leaf that is seated on the valve seat to close the annular groove, and wherein the valve seat comprises an inner peripheral side valve seat that defines an inner periphery of the annular groove and an outer peripheral side valve seat that defines an outer periphery of the annular groove, a recessed depression portion is formed in the inner peripheral side valve seat, the recessed depression portion having an opening portion on both an outer periphery of the inner peripheral side valve seat and a seating surface of the inner peripheral side valve seat on which the leaf is seated, a size of the opening portion in the seating surface of the inner peripheral side valve seat in a circumferential direction is set to be smaller than a whole circumferential length of the seating surface of the inner peripheral side valve seat, a size of the opening portion in the seating surface of the inner peripheral side valve seat in a radial direction is smaller than a size of the fluid passage in the radial direction, and the seating surface of the inner peripheral side valve seat is also formed on a radially inner side of the opening portion in the seating surface of the inner peripheral side valve seat with respect to the center of the valve disk.

6. A shock absorber comprising:

a fluid chamber, a reservoir that supplies the working fluid to the fluid chamber in response to a reduction in a pressure of the fluid chamber, and a check valve configured to allow the working fluid to flow from the reservoir to the fluid chamber and block a flow of the working fluid in an opposite direction, wherein the check valve is constituted by a leaf valve structure, the leaf valve structure comprising:

a valve disk having a center;

an annular valve seat formed on the valve disk;

an annular groove formed continuously in a circumferential direction for 360 degrees in the valve disk;

a fluid passage formed in the valve disk and having an opening in the annular groove; and a leaf that is seated on the valve seat to close the annular groove, and wherein the valve seat comprises an inner peripheral side valve seat that defines an inner periphery of the annular groove and an outer peripheral side valve seat that defines an outer periphery of the annular groove, a recessed depression portion is formed in the inner peripheral side valve seat, the recessed depression portion having an opening portion on both an outer periphery of the inner peripheral side valve seat and a seating surface of the inner peripheral side valve seat on which the leaf is seated, a size of the opening portion in the seating surface of the inner peripheral side valve seat in a circumferential direction is set to be smaller than a whole circumferential length of the seating surface of the inner peripheral side valve seat, a size of the opening portion in the seating surface of the inner peripheral side valve seat in a radial direction is smaller than a size of the fluid passage in the radial direction, the seating surface of the inner peripheral side valve seat is also formed on a radially inner side of the opening portion in the seating surface of the inner peripheral side valve seat with respect to the center of the valve disk and an area of the leaf that contacts the seating surface of the inner peripheral side valve seat is set to be greater than an area of the leaf that faces the opening portion in the seating surface of the inner peripheral side valve seat.

* * * * *